May 16, 1967   R. G. BALLARD   3,319,475
COMPENSATOR FOR GYROSCOPIC INSTRUMENT
Filed June 29, 1964

INVENTOR
ROBERT G. BALLARD
BY Richard E. Hosley

ATTORNEY

United States Patent Office 3,319,475
Patented May 16, 1967

3,319,475
COMPENSATOR FOR GYROSCOPIC INSTRUMENT
Robert G. Ballard, Saugus, Mass., assignor to General
Electric Company, a corporation of New York
Filed June 29, 1964, Ser. No. 378,771
4 Claims. (Cl. 74—5.43)

The present invention relates to gyroscopic instruments and more particularly to a compensator for such instruments used to reduce or eliminate precession errors caused by changes in ambient temperature of the instrument.

Gyroscopic instruments comprising universally mounted gyroscopes are commonly used to measure the attitude and direction of moving vehicles on which they are mounted. Because the spin axis of the gyro tends to maintain the orientation of its spin axis in space, it provides a reference against which angular movements of the vehicle may be measured. Universal movement of the gyro rotor relative to the support is provided by a gimbal system giving the gyro three degrees of freedom. In order to render the instrument insensitive to gravity and other acceleration forces, the gimbal system must be carefully balanced so that there will be no error torques tending to cause precession or drift of the gyroscope about its measurement axis. One problem encountered with such instruments is that the balance may change with variations in ambient temperature due to mass shift. This causes an error torque with a resulting drift of the gyroscope. Error torques may also be caused by windage effects due to pumping of the ambient gaseous fluid such as helium or air (referred to herein as ambient gas) by the rotor. The windage torque depends on the density of the ambient gas which, in turn, depends on temperature so that this error is also temperature sensitive. Still another type of error is that caused by temperature-variable electromagnetic torques originating in the magnetic systems of the pick-off and torquer devices commonly used on these gyroscopes to measure gyro displacement and to apply precessing torques for control purposes. All of these torques produce a net error torque variable with ambient temperature of the instrument which must be compensated for in high-accuracy instruments.

Heretofore, compensation for temperature-sensitive error torques has been provided by movable weights which are mounted on the gyro gimbal and shifted automatically in response to temperature changes by a temperature-responsive motor such as a bimetal strip. Such compensation devices are difficult to adjust in the factory so that high-accuracy instruments may have to be recalibrated several times in order to meet the drift rate tolerances over the required operating temperature range. Such recalibration is often time consuming and costly.

Accordingly, it is an object of the present invention to provide an improved temperature error compensator for gyro instruments which is easy to adjust and thus facilitates factory calibration.

Another object of the invention is to provide a temperature error compensator for gyro instruments which does not require a separate motor means to obtain a temperature-variable compensating torque and so can be produced at a low cost.

Further objects and advantages of the invention will become apparent as the following description proceeds.

Briefly, in accordance with the invention there is provided a temperature error compensator in the form of a wind vane mounted on the gyro rotor bearing frame disposed in the path of the gas stream ejected tangentially from the gyro rotor so as to produce a reactive compensating torque. Since the reactive torque varies with the density of the gas which, in turn, varies with ambient temperature, the compensating torque is varied automatically with temperature changes. By adjusting the angle of incidence of the wind vane relative to the gas stream, the direction and magnitude of the compensating torque may be adjusted to oppose and counteract the temperature error torques caused by windage, mass shift, etc.

For a better understanding of the invention, reference should be made to the following detailed description taken in connection with the accompanying drawings in which.

Figure 1:
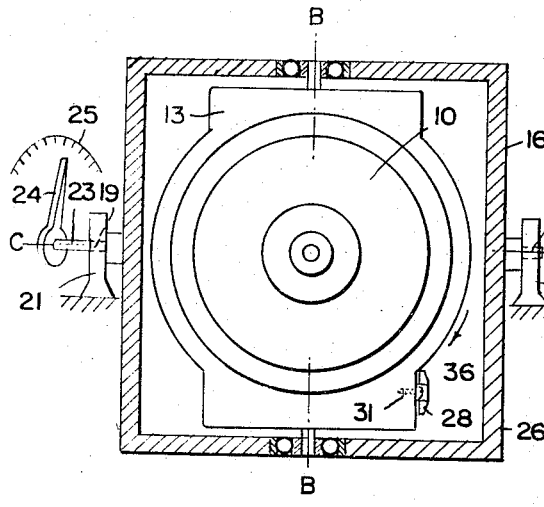
FIGURE 1 is a front elevation partly in section of a gyro instrument provided with a compensator constructed in accordance with the present invention.

Referring to the drawings, there is disclosed a universally mounted gyroscope of the type commonly used on aircraft and other moving vehicles for the purpose of measuring angular displacement of the vehicle about control axes thereof. While the gyroscope may have a number of configurations, the one illustrated has a symmetrical gyro rotor construction similar to that disclosed and claimed in Patent 2,731,836, Wendt, assigned to the same assignee as the present invention. As shown, the gyroscope has a universally mounted rotor 10 formed of two cup-shaped rotor halves 11 and 12 mounted in a spaced apart axial relationship on a common central shaft (not shown) carried by suitable bearings which permit rotation of the rotor about a spin axis A—A. The rotor bearings (not shown) are carried on a bearing frame 13 in the form of a flat plate which also carries the stator sections of an electric drive motor (not shown). The bearing frame 13 has trunnions 14 and 15 mounted on a gimbal member 16 by means of suitable bearings 17 and 18 so as to permit the bearing frame to rotate about a minor gimbal axis B—B perpendicular to the rotor spin axis A—A. The gimbal member 16 has trunnions 19 and 20 supported in suitable bearings carried by stationary supports 21 and 22 so as to permit rotation of the gimbal member about a major axis C—C perpendicular to the minor axis B—B. Because the spin axis of the gyro rotor 10 tends to maintain the orientation of its spin axis in space, angular movements of a vehicle on which the gyroscope is mounted by means of supports 21 and 22 are measured by deflection of an output shaft 23 forming an extension of trunnion 19. The shaft deflection may be indicated as illustrated schematically by means of a pointer 24 the movements of which are read against stationary scale 25. The shaft 23 may also carry an electromagnetic pick-off mechanism (not shown) used to generate electric signals for remote indication and control purposes. Gyroscopes of the type here involved are also commonly provided with electromagnetic torquers (not shown) for the purpose of applying corrective torques about the minor axis B—B to cause a corrective precession of the gyroscope about the major axis C—C.

For many applications of gyroscopes of the type here involved, the gimbal member 16 also forms an enclosing casing 26 for the gyro rotor and bearing frame which surrounds the rotor with small clearances on the sides. The casing 26 may be provided with suitable access holes 27 for adjustment purposes. During operation, rotation of the gyro rotor in the casing 26 causes a pumping of the ambient gas due to drag effects causing circulation of gas through holes 27 and inside casing 26, this action being referred to as windage. Because the construction of the bearing frame and other parts within the casing 26 is not symmetrical, the windage effect tends to produce a net torque about the minor axis B—B, causing a precession error of the gyroscope about the major axis C—C. Because the windage torque varies with the density of the ambient gas which, in turn, varies with the temperature, the windage error torques produced on the gyroscope are temperature sensitive. Windage error torques have, in the past, been reduced by the use of a shroud member closely spaced around the gyro rotor, but for many applications use of a shroud is not practical because of access requirements and clearance limitations between the gyro rotor and the gimbal casing 26. Therefore, some means must be provided for correcting for windage error torques in such applications.

There are also other temperature variable error torques involved due to unbalances of rotor parts having dimensional changes with temperature fluctuations. Still other temperature variable torques are electromagnetic in nature and are caused by dimensional changes in the magnetic structures of the pick-off and torquer devices. All of these temperature-sensitive error torques produce a net temperature error torque tending to cause a precessional error of the gyroscope about its meaurement or major gimbal axis C—C which must be corrected in high-accuracy instruments.

Figure 2:
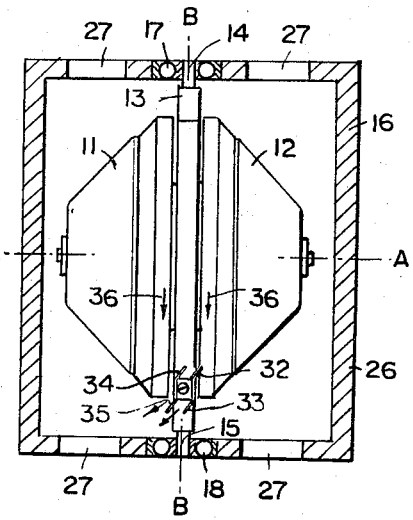
FIGURE 2 is a side elevation partly in section of the gyroscope instrument shown in FIGURE 1.
Figure 3:
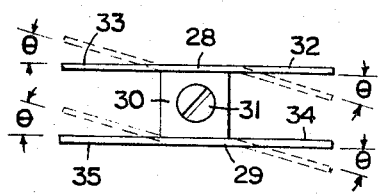
FIGURE 3 is a plan view showing constructional details of the compensator.
Figure 4:
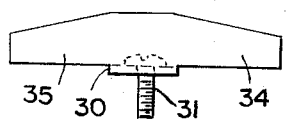
FIGURE 4 is an elevation view of the compensator shown in FIGURE 3.

In accordance with the invention, there is provided a novel temperature error compensator for opposing and compensating for the temperature error torques the construction of which will now be described. In the form illustrated, the compensator comprises a pair of wind vanes 28 and 29 carried on a common support 30 which is, in turn, mounted on the bearing frame 13 by means of a suitable fastening screw 31. The wind vane 28 has oppositely extending flexible tabs 32 and 33 which normally lie in a straight line as shown by the solid lines in FIGURE 3. Similarly, the wind vane 29 has oppositely extending tabs 34 and 35 which also normally lie in the straight-line position shown by the solid lines in FIGURE 3. The wind vanes 28 and 29 are mounted on the bearing frame 13 as shown in FIGURES 1 and 2 so that they lie in the path of ambient gas tangentially ejected from the rotor 10 indicated by arrows 36 and function like rudder airfoils. The tabs 32, 33, 34, and 35 are formed of a flexible material capable of being bent to various positions such as the one shown by the dotted lines of FIGURE 3 so that they lie at an angle $\theta$ with respect to their straight-line position. The wind vanes are mounted so that when the tabs are in the straight-line position, they extend in the direction of the gas stream ejected by the gyro rotor which may be called a neutral position in which no compensating torque is exerted on the bearing frame 13. However, when the tabs are bent to form an angle with respect to the gas stream, they cause a deflection of the gas stream and so experience a reactive force, the amount of which depends upon the magnitude of the angle $\theta$. Since the wind vanes are displaced from the minor gimbal axis B—B, a torque is exerted about that axis tending to cause a precession of the gyroscope about the major axis C—C. By adjusting the magnitude of the angle $\theta$, the magnitude of this compensating torque may be adjusted to the desired value. Also, the direction of the compensator torque may be controlled by selecting the direction in which the tabs 32, 33, 34, and 35 are bent. As illustrated in FIGURE 2 of the drawing, it will be noted that the tabs 32 and 34 are bent to the right while the oppositely extending tabs 33 and 35 are bent to the left. In this way the gas stream represented by the arrows 36 is deflected to the left, causing a reactive force to the right. Conversely, if the tabs are bent in the opposite direction, it will be apparent that the reactive force will be to the left. By mounting the compensator so that the two wind vanes 28 and 29 are on opposite sides of the center line of bearing member 13 and by adjusting the tabs so that all angles $\theta$ are equal, the compensation adjustment may be made without affecting the static balance of the bearing member 13. While more effective operation is obtained by the use of two vanes, it will be understood that, if desired, only one vane may be used, in which case it would be mounted on the center line of bearing member 13.

Figure 5:
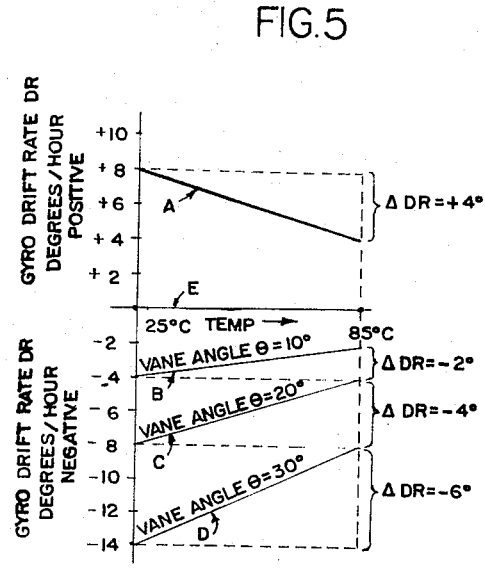
FIGURE 5 is a graphical representation useful in explaining the theory of operation of the compensator.

The manner in which the compensator is used to achieve compensation for temperature error effects will now be explained with reference to the graphical representation shown in FIGURE 5 of the drawing. Referring to FIGURE 5, the curves shown represent the variation of the gyro drift rate, positive and negative, with the changes in operating ambient temperature of the gyro, which may, for example, be 25° C. to 85° C. It will be assumed that a gyro subject to temperature errors is first tested for drift with the compensator tabs in the straight-line position for zero compensating torque. The curve A shows the change in drift rate with temperature from which it will be noted that the drift rate changes from a positive 8° per hour at 25° C. to a positive 4° at 85° C., giving a change in drift rate $\Delta DR$ of 4° over the operating temperature range. For high-accuracy gyro instruments, specifications may require drift error to be not in excess of 1° per hour so that for such a case compensation for temperature error is required.

The curves B, C, and D of FIGURE 5 illustrate the effect of the compensator with the vane angle $\theta$ at various angles such as 10°, 20°, and 30°. These curves illustrate the change in gyro drift rate for a case where the only torque is that provided by the compensator such as would be the case where the gyro being tested is perfectly balanced and has zero temperature error. Thus, for the case where the vane angle is 10°, it will be noted that the gyro drift rate changes from a −4° per hour to −2° per hour, giving a change in drift rate $\Delta DR$ of −2°. When the vane angle is increased to 20°, the drift rate $\Delta DR$ is 4° per hour and for a 30° vane angle the drift rate is −6° per hour. In the case under consideration, it will be noted that the curve C gives a change in drift rate $\Delta DR$ of −4° which is equal and opposite to the change in drift rate of +4° of the gyro without compensation and so this vane angle would be selected for complete temperature error compensation. Thus, in actual use the tabs 32, 33, 34, and 35 of the compensator are bent to an angle $\theta$ that gives a compensating torque equal and opposite to the temperature error torques, thus giving essentially complete compensation. This is indicated by the curve E showing zero drift rate throughout the temperature range of operation. After the vane angle $\theta$ has been selected to give the proper change in drift rate $\Delta DR$ for compensation, an adjustment of the static balance of the gimbal is sometimes required in order to zero the net torque about the minor axis B—B in the operating temperature range.

Because the reactive torque exerted by the wind vane is dependent upon the density of the gas stream ejected from the rotor which is, in turn, dependent upon the temperature of the gas, the compensator torque and hence the drift rate $\Delta DR$ varies automatically with temperature as indicated by the slopes of the curves B, C, and D. Thus, the compensator torque varies automatically with temperature changes and so can be made to approximately cancel out the net temperature error torques throughout the desired temperature range of operation.

It will be understood that in some high-accuracy applications, the wind vane compensator may be used in conjunction with other forms of temperature error compensators to facilitate a final factory adjustment. In such an application the wind vane compensator may act to provide a final vernier adjustment.

While the bendable tab arrangement provides a simple and inexpensive way to adjust the compensator vane angle, it will be obvious that other mechanical arrangements such as pivoted tabs may be used without departing from the invention.

While there have been described what are at present considered to be the preferred embodiment of the invention, it will be apparent to those skilled in the art that various changes and modifications may be made therein without departing from the spirit or scope of the invention.

What I claim as new and desire to secure by Letters Patent of the United States is:

1. A gyroscopic device comprising a gyroscope having a rotor mounted on a bearing frame for rotation in an ambient gas about a spin axis, a gimbal member, means mounting said bearing frame on said gimbal member so that it is free to rotate about a minor axis perpendicular to said rotor spin axis, means mounting said gimbal member on a support so that it is free to rotate about a major axis perpendicular to said minor axis, said gyroscope being subject to error torque about said minor axis due to temperature-variable effects tending to cause precession and drift of said gyroscope about said major axis, and compensator means for reducing the rate of said drift to acceptable limits comprising, a wind vane mounted on said bearing frame displaced from said minor axis and disposed in the path of a stream of said ambient gas ejected tangentially from said rotor due to drag pumping action.

and means for adjusting the angle of said wind vane relative to said gas stream in a direction to produce a reactive torque about said minor axis opposing and counteracting said error torque, said reactive torque being variable as a function of said incidence angle and the temperature of said ambient gas.

2. A gyroscopic device as set forth in claim 1 wherein the wind vane comprises a flexible member capable of being bent to form the desired angle relative to the gas stream.

3. A gyroscopic device as set forth in claim 1 wherein the wind vane comprises oppositely extending flexible members capable of being bent in opposite directions to deflect the gas stream in the desired direction without affecting the static balance of the bearing frame about the minor axis.

4. A gyroscopic device as set forth in claim 1 wherein the wind vane comprises two pairs of oppositely extending flexible members located symmetrically on opposite sides of said minor axis in juxtaposed relation, each pair of said flexible members being capable of being bent in opposite directions to deflect the gas stream in the desired direction without affecting the static balance of the bearing frame about the minor axis.

References Cited by the Examiner

UNITED STATES PATENTS

| | | | |
|---|---|---|---|
| 2,366,543 | 1/1945 | Meredith | 74—5.43 X |
| 2,492,057 | 12/1949 | Noxon | 74—5.43 |
| 2,997,886 | 8/1961 | Jones | 74—5.7 |

FRED C. MATTERN, Jr., *Primary Examiner.*

J. D. PUFFER, *Assistant Examiner.*